Inventor:
Franz Werner
by Karl F. Ross
AGENT 2,803,182
Patented Aug. 20, 1957

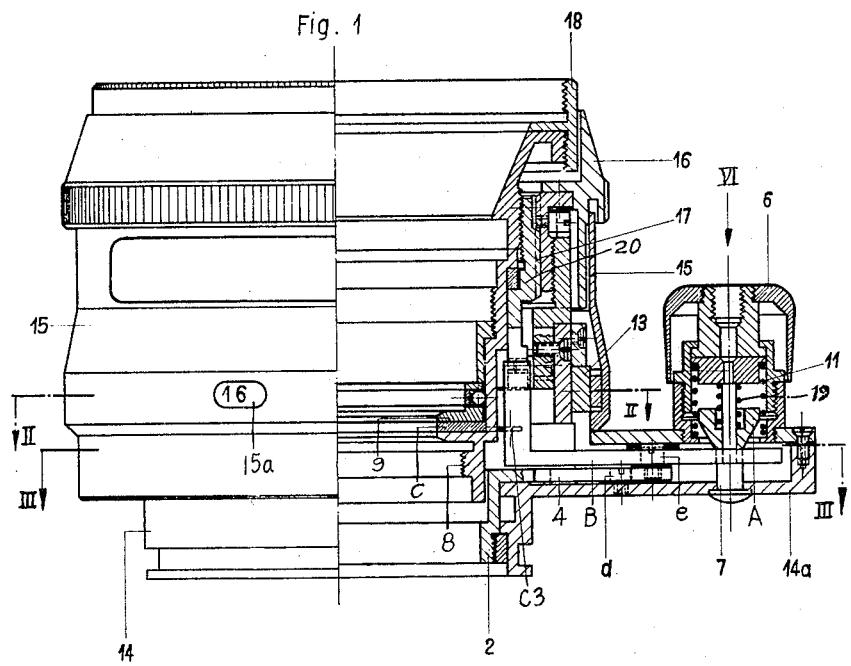
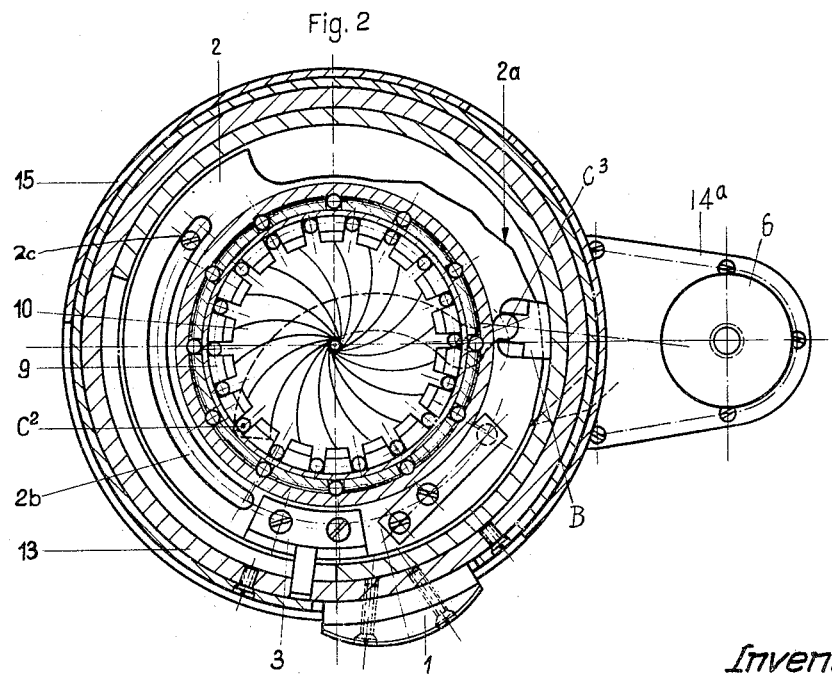

2,803,182

OPTICAL SYSTEM WITH AUTOMATIC ADJUSTMENT TO PRESELECTED DIAPHRAGM OPENING

Franz Werner, Munster-Sarmsheim, Germany, assignor to Jos. Schneider & Co., Kreuznach, Rhineland, Germany, a firm Application August 10, 1953, Serial No. 373,327

Claims priority, application Germany August 28, 1952

7 Claims. (Cl. 95—64)

The present invention relates to an optical system for photographic cameras of the type disclosed in U. S. Patent No. 2,612,093, owned by the assignee of this application, wherein a diaphragm is held in wide-open position during view finding and is automatically brought into a pre-selected operating position upon actuation of a shutter release. Systems of this character are particularly, though not exclusively, adapted for use with so-called "one-eyed" reflex cameras utilizing a common objective for view-finding and picture-taking purposes.

Earlier systems of the general type set forth above employ the force of a restoring spring to move the diaphragm to its selected stop. This spring has a tendency to fatigue and, thereby, to become gradually incapable of readjusting the diaphragm with the necessary rapidity; moreover, the spring-controlled movement of the diaphragm ring to its preselected position involves an impact which under some conditions may result in a blurring of the picture. Another drawback resides in the necessity for resetting the diaphragm between exposures.

The present invention has for its general object the provision of means for automatically changing the diaphragm opening immediately prior to the taking of a picture, in a preselectable manner, without encountering any of the inconveniences set forth above.

More particularly, it is an object of this invention to provide means for normally maintaining a diaphragm (preferably one of the iris type) in a predetermined position (usually the position of maximum opening) and momentarily moving the diaphragm to a preselected position during operation of the shutter release mechanism.

Another object of the instant invention is to provide diaphragm control means adapted to effect the aforesaid preselection and displacement with the aid of simple and easily operated elements of construction.

A feature of the invention resides in the provision of a contour disk or cam adapted to occupy a plurality of different operative positions, each corresponding to a selected diaphragm opening, in combination with a diaphragm-adjusting mechanism including control means adapted to be triggered by an actuating member, such as a trip button for the shutter release, for momentarily moving the diaphragm from its normal position to one determined by the position of the cam. The control means may include a pivoted arm spring-urged against the cam surface and controlling the position of a shift lever, the latter being positively coupled with a diaphragm-setting member and being operable by a preferably conical actuating element carried by the shutter release member.

The above and other objects and features of the invention will become more fully apparent from the following description, reference being made to the accompanying drawing in which:

Fig. 1 shows, partly in view and partly in axial section, the objective of a camera provided with diaphragm control means according to the invention;

Fig. 2 is a section taken on the line II—II of Fig. 1;

Figure 3:
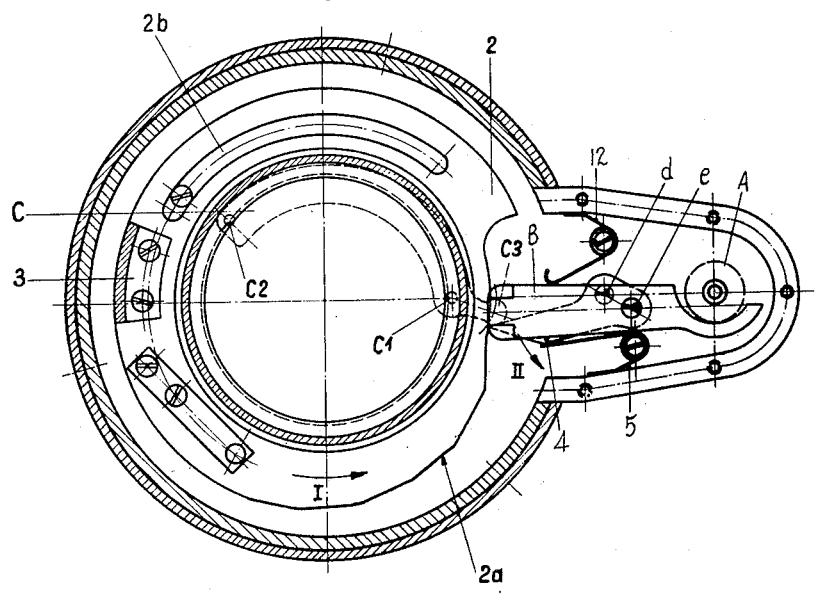
Fig. 3 is a section taken on the line III—III of Fig. 1.

The embodiment of the invention illustrated in the drawing comprises a knob 1 on a diaphragm-adjusting ring 13 rigidly coupled with a cam disk 2 by means of a connecting member 3; it will be noted that the contour of disk 2 comprises a plurality of dwells 2a, corresponding to the various diaphragm stops, and that the disk is provided with an arcuate groove 2b receiving a guide pin 2c.

The cam disk 2 is rotatably mounted in a coupling sleeve 14 serving to connect the objective to the body of a conventional camera (not shown), this sleeve being provided with an extension 14a carrying the shutter release button 6. The button 6, urged upwardly (Fig. 1) by the force of a spring 11, is provided with a pin 7 whose head is designed to act upon the trip member (not shown) of the shutter release mechanism when the button is depressed in the direction of the arrow in Fig. 1. A conical diaphragm actuator A, surrounding the pin 7, is urged by a spring 19 to follow the movement of this pin when the button 6 is depressed. Reference is made to co-pending application Ser. No. 315,921, filed October 21, 1952 by Karl Heinz Schütz and owned by the assignee of the present application, for an illustration of the action of a release button upon a shutter trip member.

Pivoted at $d$ to the coupling extension 14a is an arm 4 urged by a spring 5 into contact with the contour of cam disk 2 and further pivoted at $e$ to a floating shift lever B, the latter being acted on by a spring 12. The lens barrel 8, axially displaceable for focusing purposes by means of a setting ring 16 and held against rotation by suitable means (not shown), carries a fulcrum pin $C_1$ on which there is pivoted a diaphragm-setting lever C which in part constitutes one of the iris leaves of the diaphragm and is positively coupled at $C_3$ to the shift lever B; a slotted iris control ring 9, determining the position of the iris leaves 10 in known manner, is coupled with a pin $C_2$ to the extremity of lever C opposite shift lever B, the coupling pin $C_2$ entering one of the slots of ring 9 affording enough play to enable rotative entrainment of this ring by the lever C when the latter swings about its fulcrum $C_1$. It may be mentioned that lever C is similar in construction to the iris control lever disclosed in my co-pending application Ser No. 373,314, filed on even date herewith, now abandoned.

Rotatably mounted with respect to the stationary objective support 14, 14a is the focusing assembly, including the aforementioned setting ring 16, threadedly connected at 17 with the focusing tube 20 and, through it, with the lens barrel 8. A sleeve member 15, containing a cutout for the diaphragm scale 15a and a similar cutout for the distance scale (not shown), is held stationary on the support 14. At 18 there has been shown a threaded member of the lens barrel assembly adapted to receive the holder for the front lens (not shown).

Figure 4:
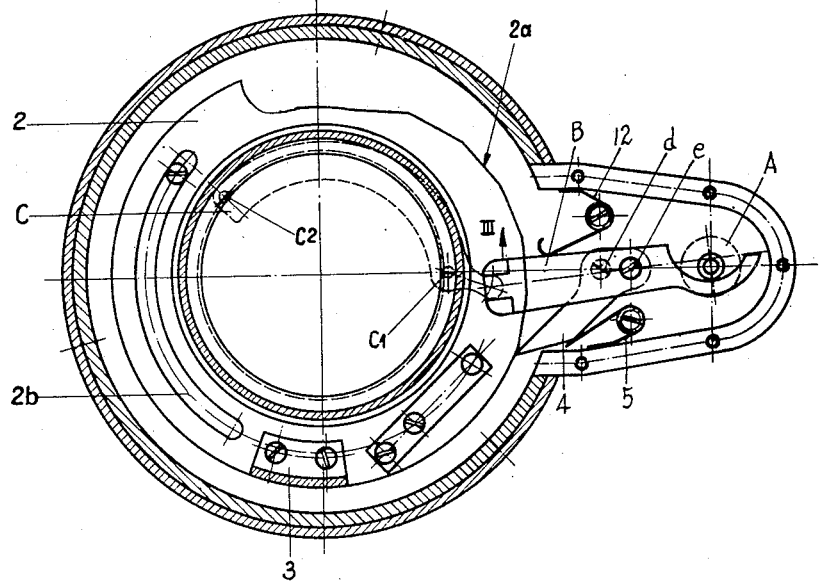
Figs. 4 and 5 are sectional views similar to those of Fig. 3 but showing the mechanism in different operating positions.
Figure 5:
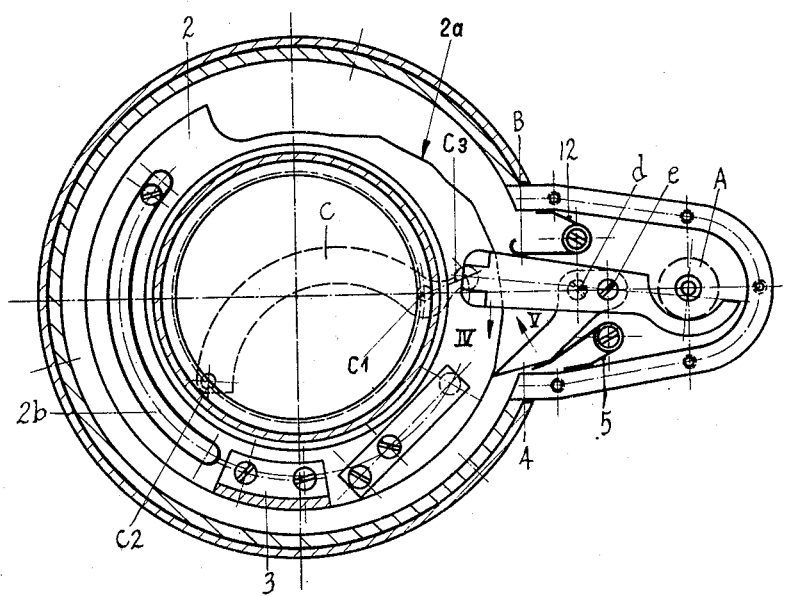

The above-described system according to my invention operates as follows:

Ring 13 is rotated by means of knob 1, e. g. counterclockwise as indicated by arrow I in Fig. 3, until the desired diaphragm opening appears at 15a in the window of sleeve member 15. This rotation displaces the cam disk 2, which may initially have occupied the position shown in Fig. 3, into the position of Figs. 4 and 5 and causes the arm 4 to rotate on its fulcrum $d$ (arrow II, Fig. 3), thereby altering the position of shift lever B which, as shown in Fig. 4, swings counterclockwise about its temporary pivot $C_3$. It will be readily understood that this swinging movement is due to the upward displacement of pivot pin $e$ on arm 4 and to the downward pressure of spring 12 upon the left-hand end of shift lever B, whereby the right-hand end of this lever will be raised so as to enter the path of conical actuator A. From a comparison of Figs. 3 and 4 it will be noted that the rotation of cam disk 2 has not affected the position of junction $C_3$ between the left-hand end of lever B and the right-hand extremity of lever C, and that consequently the latter lever will remain in its original position corresponding to maximum opening of the diaphragm. It will also be apparent that the extent of the rotation of disk 2 determines the extent of the displacement of arm 4 and, thereby, the extent to which the right-hand end of shift lever B overlies the path of actuator A.

It will thus be seen that the only change effected by preselecting a diaphragm opening other than maximum opening is a rearrangement of parts of the diaphragm-setting mechanism involving a greater or less departure thereof from the reference position shown in Fig. 3. After view-finding has been completed, the button 6 is depressed in the direction of arrow VI (Fig. 1) and the conical actuator A cams aside the shift lever B whose fulcrum $e$ is positively prevented, by the contact between arm 4 and a dwell $2a$ of disk 2, from following the downward motion of the right-hand extremity of the shift lever. Hence the junction $C_3$ is raised (arrow III, Fig. 4) by a distance commensurate with the camming displacement of shift lever B by actuator A, and lever C is correspondingly rotated about its fixed fulcrum $C_1$ to cause the junction $C_2$ to move downwardly and to rotate the iris control ring 9 (Figs. 1 and 2) through a predetermined angle, thereby reducing the opening of the diaphragm 10 to the value appearing at $15a$. As the button 6 is further depressed, a cylindrical portion of actuator A above its conical camming portion comes into contact with shift lever B and maintains the latter in fixed position while the pin 7 triggers the shutter release proper (not shown), the presence of spring 19 enabling pin 7 to travel through the required distance without substantial further displacement of the actuator A.

When the user releases the button 6 after taking the picture, restoring spring 11 returns pin 7 and actuator A to their normal position and the diaphragm control mechanism reverts to the position of Fig. 4, shift lever B being rotated, through its spring 12, counterclockwise (arrow IV in Fig. 5) back to its preselected position. A new picture can now be taken without further adjustment, unless external circumstances require the preselection of a different diaphragm opening; in the latter instance the cam disk 2 might be rotated, for example, toward a position of larger diaphragm opening (thus clockwise, as viewed in Figs. 3–5), enabling spring 5 to move the arm 4 clockwise (arrow V, Fig. 5) toward contact with another dwell $2a$ on that disk and modifying the position of shift lever B accordingly.

It will be observed that the "floating" shift lever B has two degrees of freedom of movement, namely, a swinging movement around pin $e$ and a displacement along with said pin in an arc around fulcrum $C_3$, and that the cam disk 2 of the selector mechanism operates to block the last-mentioned one of these movements, thereby enabling the actuator A to operate control lever C through lever B which has been restricted to a single degree of movement (around its pivot). It may also be pointed out that the restoring action of spring 12 comes into play only after the taking of a picture has been completed and that, apart from the transmission of finger pressure through compression spring 19 (which could be omitted, if desired, with suitable extension of the cylindrical portion of actuator A), motion to contract the diaphragm is imparted to lever C exclusively through positive forces.

In the light of the analysis immediately preceding it should be apparent that a wide range of mechanical equivalents will be available for carrying out the broad objects of my invention without departing from the spirit and scope thereof as defined in the appended claims.

I claim:

1. An optical system comprising a support, an adjustable diaphragm on said support, control means displaceable relatively to said support for adjusting said diaphragm to different opening sizes, selector means on said support displaceable independently of said control means to a position corresponding to a selected diaphragm opening, a link member pivotally secured to said support and operatively coupled with said selector means, a pivot fixed to said link member and adapted to occupy different positions relative to said support in response to displacement of said selector means, a shifting element fulcrumed on said pivot and coupled with said control means, actuating means for rotating said shifting element about said pivot, thereby displacing said control means to an extent determined by the position of said selector means, and restoring means for returning said control means to a normal position following inactivation of said actuating means.

2. A system according to claim 1, wherein said actuating means comprises a substantially conical cam member positioned adjacent a portion of said shifting element spaced from said pivot, said selector means by the displacement of said link member varying the extent to which said portion of said shifting element projects into the path of said cam member.

3. A system according to claim 2, wherein said shifting element is a lever having one end linked to said control means and having its opposite end positioned adjacent said cam member.

4. A system according to claim 2, wherein said cam member is provided with a cylindrical extension enabling further displacement of said actuating means without change in the position of said shifting element, said actuating means upon such further displacement being adapted to trip a shutter associated with said optical system.

5. A system according to claim 2, wherein said actuating means comprises a shutter release button and resilient coupling means between said button and said cam member, said coupling means enabling displacement of said button into shutter-tripping position without entrainment of said cam member beyond an extreme position of the latter.

6. A system according to claim 1, wherein said selector means comprises cam means and spring means urging said link member into contact with said cam means.

7. A system according to claim 1, wherein said selector means comprises a rotatable disk concentric with said diaphragm.

References Cited in the file of this patent

UNITED STATES PATENTS

| | | |
|---|---|---|
| 720,586 | Holst | Feb. 17, 1903 |
| 871,654 | Watkins et al. | Nov. 19, 1907 |
| 2,213,742 | Mihalyi | Sept. 3, 1940 |
| 2,218,241 | Hughey | Oct. 15, 1940 |
| 2,435,752 | Pearce | Feb. 10, 1948 |
| 2,664,796 | Stein et al. | Jan. 5, 1954 |